Witnesses:
Clyde Hoffman
A. L. McClintock

Inventor
Charles A. Edmonds
by C. E. Humphrey
Atty.

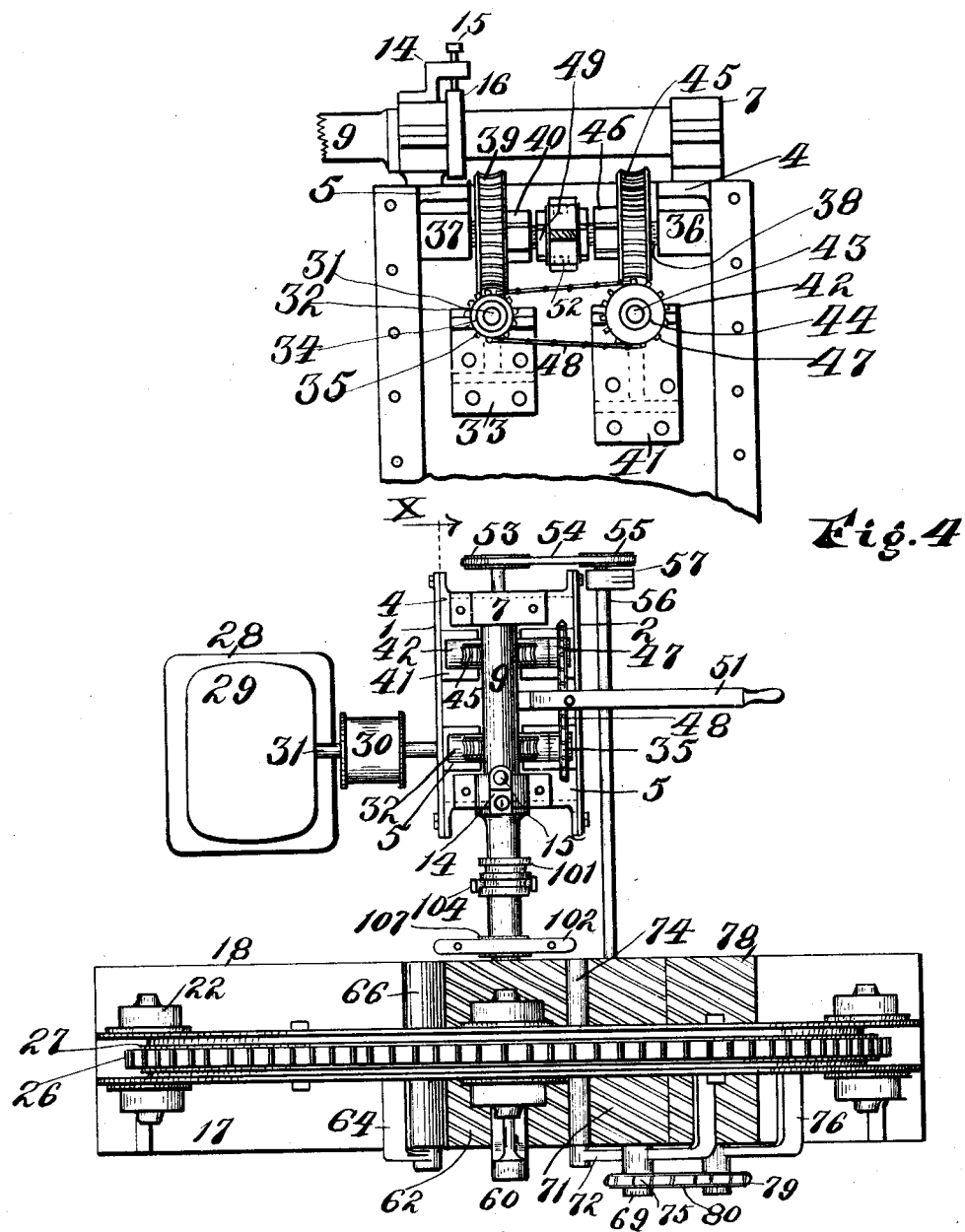

UNITED STATES PATENT OFFICE.

CHARLES A. EDMONDS, OF AKRON, OHIO, ASSIGNOR OF ONE-HALF TO THE SWINEHART TIRE AND RUBBER COMPANY, OF AKRON, OHIO, A CORPORATION OF OHIO.

TIRE-SHOE-MAKING MACHINE.

1,080,683. Specification of Letters Patent. Patented Dec. 9, 1913.

Application filed December 5, 1912. Serial No. 735,080.

*To all whom it may concern:*

Be it known that I, CHARLES A. EDMONDS, a citizen of the United States, residing at Akron, in the county of Summit and State of Ohio, have invented new and useful Improvements in Tire-Shoe-Making Machines, of which the following is a specification.

This invention relates to machines for manufacturing tire shoes or casings for double-tube pneumatic tires, and the object thereof is, broadly speaking, to provide a machine by which the fabric carcass of a tire-shoe can be rapidly and easily manufactured with any desired tension imposed upon each layer, and a uniform tension imposed upon all portions of each layer.

More particularly, the invention consists in providing mechanism embodying means for holding a core or mandrel on which the tire-shoe is to be manufactured, stationary throughout the making or formation of the tire-shoe and revolving the fabric-carrying stock-roll about the stationary core during the superimposition of the layers of fabric on the core during the building up of the carcass of the tire-shoe.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
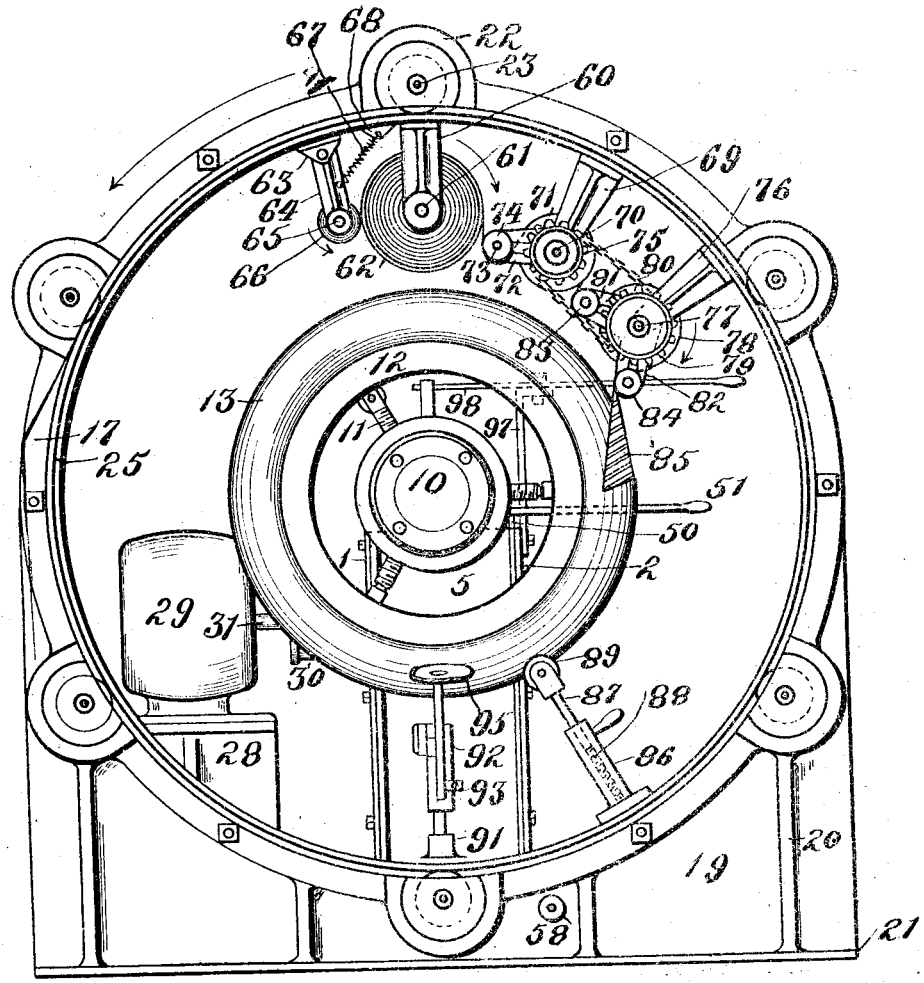
Figure 2:
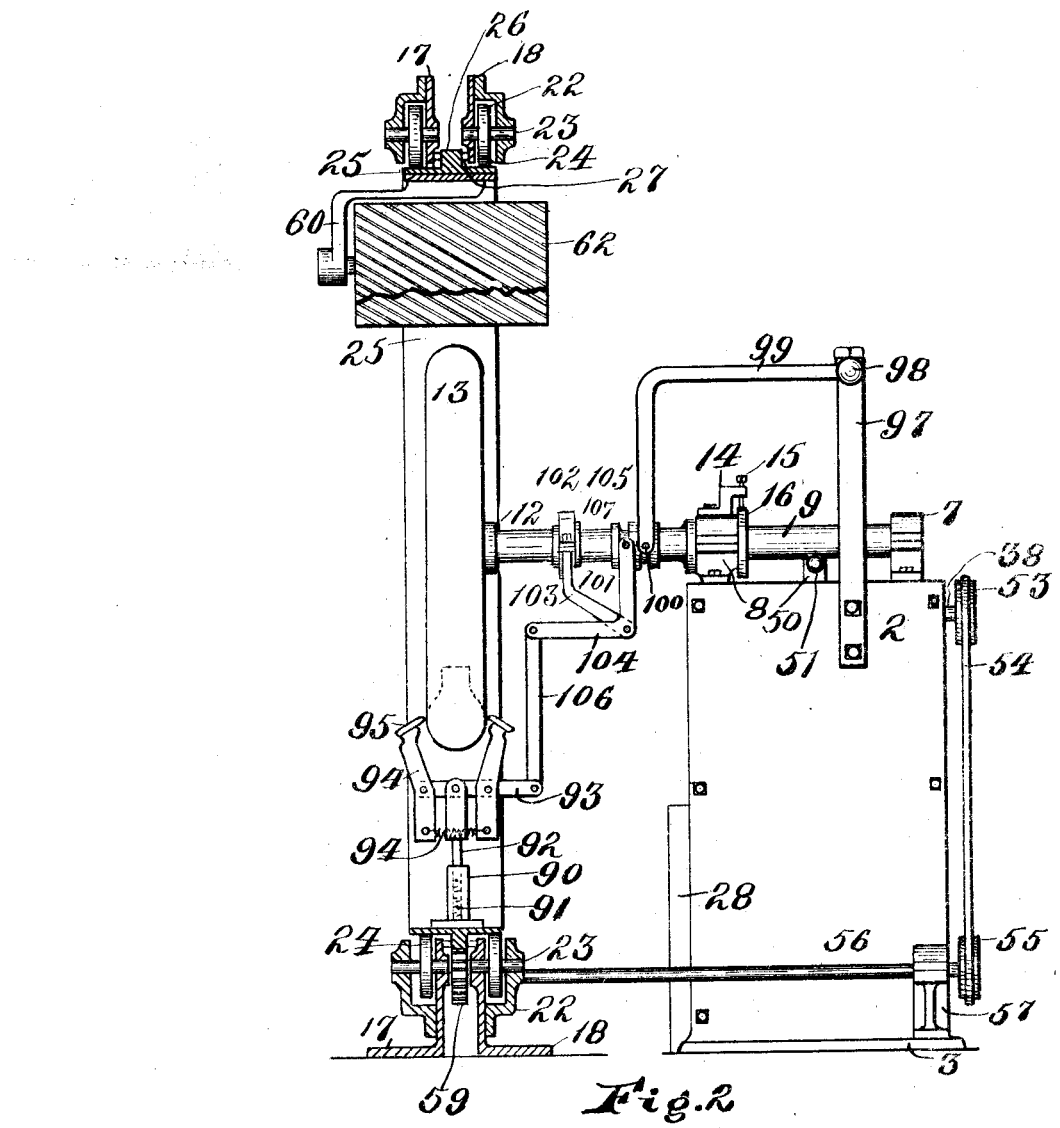

In the drawings in which similar reference numerals indicate like parts in the different figures, Figure 1, is a view in side elevation of a tire-shoe making machine embodying this invention; Fig. 2, is a side elevation looking from the right of Fig. 1 with a portion of the mechanism in central vertical section; Fig. 3, is a plan; and, Fig. 4, is a sectional view of a portion of the mechanism shown in Fig. 3 on line X thereof.

The mechanism for manufacturing a tire-shoe embodies means for supporting a core during the formation of the tire-shoe thereon and also mechanism for superimposing on the core the various successive layers of fabric which go to make up the carcass of the same.

The means employed for supporting the core embodies an upright housing consisting of side plates 1 and 2 mounted on a suitable base 3 and united through the medium of transverse members 4 and 5 which are bolted or otherwise secured to the side plates 2 through the medium of hold-fast devices 6. Mounted on the transverse member 4 is a bearing 7 and mounted on the transverse member 5 is a bearing 8. Mounted in these is a shaft 9 provided at one end with a chuck 10 having radially-extensible arms 11 the outer ends of which are adapted to grasp or engage the inwardly-extending flange 12 of a core 13 on which the tire is to be built up. The arrangement of this chuck is of ordinary construction and it is contemplated that the three radially-extensible arms 11 may be moved outwardly and inwardly simultaneously to engage in a suitable form of groove on the inner face of the flange 12 and thereby hold the core 13 concentric with the axis of the shaft 9. Mounted on the bearing 8 is a member 14 in which is mounted a radially-movable pin 15 adapted to engage a suitable aperture in a fixed collar 16 on the shaft 9 for holding the latter against unintentional rotation.

The mechanism for laying on repeated strips of fabric on the core 13 embodies a pair of annular members 17 and 18 each embodying an upright portion 19 consisting of a web and stiffened through the medium of ribs 20, and both are also provided with base flanges 21. These members 17 and 18 are ring-shaped and are arranged parallel and concentric with the axis of the shaft 9. At intervals on the outer faces of the members 17 and 18 are hollow housings 22 provided with apertures registering with suitable apertures in the members 17 and 18 to provide bearings for pairs of alined short shafts 23 on which are mounted friction-reducing rollers 24. These rollers and their inclosing housings 22 are preferably arranged at regular intervals throughout the members 17 and 18 and as shown in the drawings are arranged at the angles of an imaginary hexagon. Adapted to be rotatably mounted on, and supported by the rollers 24 is an annular stock-carrier 25 provided on its periphery with a centrally-arranged integral spur-gear 26, projecting between the inner opposing faces of the members 17 and 18. In order to hold the annulus against lateral movement there is provided between the inner opposing faces of the members 17 and 18 and the side faces of the gear 26 a pair of wear-reducing rings 27 preferably of brass.

The mechanism for revolving the stock-carrier 25 embodies the following mechanism: Mounted on a suitable standard 27 is a motor 29 on the armature shaft of which is a clutch 30 by which motion is transmitted to a shaft 31, and it may be stated at this point, that no particular form of clutch is shown as the form of clutch employed is not material to this invention. The shaft 31 is supported in bearings 32 mounted on brackets 33 secured by suitable hold-fast devices to the inner opposing faces of the side plates 1 and 2. The shaft 31 bears a worm 34 positioned immediately below the shaft 9. This shaft 31, at the end which is opposite to that on which the clutch 30 is mounted, bears a sprocket-wheel 35. Secured to the under face of the transverse members 4 and 5 are a pair of depending bearings 36 and 37, respectively, mounted in which is a longitudinal shaft 38 parallel with the shaft 9. Mounted on the shaft 38 immediately above the shaft 31 is a worm-gear 39 adapted to mesh with the worm 34 and be driven thereby. The hub of the worm-gear 39 is provided with one member of a square-jawed clutch 40.

Mounted on suitable brackets 41 secured to the inner opposing faces of the plates 1 and 2 are a pair of alined bearings 42 in which is rotatably mounted an idler shaft 43 bearing immediately below the shaft 9 a worm 44 arranged to mesh with a worm-gear 45 loosely mounted on the shaft 38. The hub of the gear 45 is provided with one member of a square-jawed clutch 46. One end of the shaft 43 is provided with a sprocket-wheel 47 to receive a sprocket-chain 48 for communicating motion from the sprocket-wheel 35 on the shaft 31. Splined on the shaft 38 between the members 40 and 46 is a member 49 of a square-jawed clutch which embodies a grooved collar, the hubs of which are notched to engage, in alternation, in the square-jawed clutch members 40 and 46. Secured on a suitable post 50 (see Fig. 1) as a pivot, is a lever 51 the inner end of which is bifurcated to inclose the member 49 and is provided with nogs 52 running in the groove in the collar 49, so that when the lever 51 is shifted the clutch member 49 will alternately engage the square-jawed clutch members 40 and 46 for transmitting motion from the shaft 31 to the shaft 38 the speed of rotation of which depends upon which of the clutch members 40 or 46 is engaged thereby, that is to say, if the clutch member 49 is thrown into clutching relation with the clutch member 40 on the gear 39, the shaft 38 will be rotated at a certain speed and if the member 49 is thrown into clutching relation with the clutch member 46, the gear 45 and shaft 38 will be rotated at a different speed due to the communication of motion through the medium of the sprocket-chain 48 from the sprocket-wheel 35 to the sprocket-wheel 47. The shaft 38 bears on its rear end a pulley 53 to receive a belt 54 which also runs over a pulley 55 on a shaft 56 mounted in a bearing 57 on the base plate 3 and also in bearings 58 (see Fig. 1) in the members 17 and 18. The shaft 56 bears a fixed pinion 59 positioned between the members 17 and 18 and which is arranged to intermesh with the gear-teeth 26 on the outer face of the stock-carrier 25. From the foregoing it will be seen that the stock-carrier 25 may be revolved on the rollers 24 at varying speeds through the medium of the hereinbefore described mechanism.

The mechanism for applying successive layers of fabric to the core 13 embodies the following mechanism, and reference is especially directed to Fig. 1. Secured to the inner face of the stock-carrier 25 is a radial bracket 60 bearing a shaft 61 parallel with the axis of revolution of the annulus, and on which is mounted a stock-roller 62 carrying a winding of layers of rubber-coated fabric or thread fabric, or any other suitable tire-building material alternately with which is a layer of muslin or canvas for keeping the layers from unintentionally adhering to each other. The peculiar mechanism for holding the stock-roller or bobbin 62 in position on the shaft 61 is immaterial and no specific means are either shown or described. Also secured to the inner face of the stock-carrier 25 through the medium of a hinge 63 is an arm 64 on the lower end of which is a transverse shaft 65 bearing a take-up roller 66 the object of which is to take up the unwound strip of muslin or canvas from the stock-roller 62 as the stock of rubberized fabric is unwound therefrom. The take-up roll 66 is held in snug engagement with the periphery of the stock on the stock-roller through the medium of resilient element 67 which is suitably anchored at 68.

Secured to the inner face of the stock-carrier 25 is a radial arm 69 bearing a transverse-shaft 70 on which is mounted an idler roll 71. The arm 69 also bears a projecting arm 72 bearing a shaft 73 on which is an idler roll 74. The shaft 70 also bears a sprocket-wheel 75 for a purpose to be later described.

Secured to the inner face of the stock-carrier 25 is another bracket 76 which carries a transverse shaft 77 on which is an idler roll 78. The shaft 77 also bears outside of the bracket 76 a sprocket-wheel 79 to receive a sprocket chain 80 for inducing simultaneous rotation of the two shafts 70 and 77 with their idler rolls 71 and 78. The bracket 76 also is provided with a pair of laterally-projecting arms 81 and 82 which bear respectively transverse shafts on which are mounted rolls 83 and 84.

The operation of the foregoing mechanism is as follows: A strip of fabric 85 is rolled up with an alternate winding of a separating medium, such as muslin or canvas on the stock-roller 62, and from thence unwound for use on the core 13, and at the same time, the supply of separating substance, either muslin or fabric is wound up on the take-up roller 66. The rubberized fabric passes from the stock-roller 62 inwardly around the face of the roll 73, and from thence, inwardly around the roll 83, and from thence, around the idler 78, and around the roll 84, and is then applied to the outer surface of the core 13 and as the member 25 revolves in the direction of the arrow, it will be applied to the surface of the core in the usual manner employed for building up a tire-shoe on a core or mandrel.

It will be noted that the sprocket-wheels 75 and 79 are of different sizes, so that the peripheral speed of the rolls 71 and 78 is different and thereby uniform tension is imposed on the fabric during its placement on the core.

In order to properly apply the strip and roll out all bubbles and unevenness which might exist, in placing the fabric 85 on the core 13, suitable instrumentalities are employed, the functions of which are to place the fabric evenly and smoothly on the surface of the core 13. One of these instrumentalities which I employ for rolling the fabric 85 on the tread or outer surface of the core 13, embodies a tubular member 86 secured to the inner face of the stock-carrier 25 and in which is a plunger 87 forced inwardly under normal conditions through the medium of a coiled resilient element 88. The inner end of the plunger 87 bears a roller 89 with a concave face the purpose of which is to roll down the strip of fabric 85 onto the tread portion of the core 13.

In order to perform the operation of "stitching" which, as is known in the art, is the ironing or rolling of the strip of fabric along the lateral faces and inner faces of the core, I employ a tubular member 90 in which is a spring 91 adapted to force inwardly toward the center of the core a plunger 92, the operation of which is similar to the operation of a piston in a cylinder. The inner or head end of the plunger 92 bears a pivotally-mounted cross-arm 93 to which is pivotally united a pair of rocking-arms 94 bearing at their inner ends stitching rollers 95 and having their opposite ends connected by means of a resilient element 96 to force these ends apart and the stitching rollers inwardly against the side faces of the core.

It will be noted that the normal tendency of the spring 91 is to force the roller 95 inwardly toward the center of the core, and the mechanism employed for forcing them outwardly and causing them to travel over the surface of the fabric during its placement on the core embodies the following mechanism: Secured on the plate 2 is an upright standard 97 on the upper end of which is pivoted a horizontal lever 98, to the inner end of which is pivotally united an L-shaped lever 99, the opposite end of which is bifurcated and provided with a pair of pins constituting nogs 100. Longitudinally-shiftably mounted on the shaft 9 is a grooved sleeve 101 in one of the grooves of which the nogs 100 are adapted to travel so that as the lever 98 is shifted from left to right, and vice versa, the collar 101 will be shifted on the shaft 9.

Fixedly mounted on the shaft 9 is a grooved collar 107 in the groove of which are secured the separable halves of a yoke or head end 102 of a fulcrum-forming arm 103 to the opposite end of which is pivoted a bell-crank lever 104 the inner end of which is bifurcated and provided with a pair of pins constituting nogs 105 adapted to run in one groove in the collar 101. The opposite end of the bell-crank lever 104 is connected through the medium of a link 106 with the transverse arm 93.

From the foregoing, it will be noted that as the sleeve 101 is shifted longitudinally of the shaft 9, it will rock the bell-crank lever 104, thereby causing the plunger 92 to move radially inwardly and outwardly toward the center of the core, thereby carrying the stitching rolls 95 over the lateral faces of the fabric on the core-body.

I claim:

1. A tire-shoe-making machine comprising a normally-irrevoluble ring-core, an annulus arranged to revolve about said core in substantially the plane thereof, a stock-roller for carrying a supply of stock secured to the inner face of said annulus, means for leading the material from said stock-roller to said core, means for imposing tension on said material during its placement on said core, and a plurality of inwardly-projecting and radially-positioned tire-shoe shaping-tools secured to said annulus and engaging the material on said core during the placement of said material.

2. A tire-shoe-building machine embodying a normally-non-rotatable shaft, a core-holding chuck thereon, supporting means for said shaft, an annulus revoluble about said core, means for revolving it, a stock-roller for carrying a supply of tire-shoe building material on said annulus to permit the placement of the material on said core during the revolution of said annulus, tire-shoe shaping-tools on said annulus and adapted to engage the tire-shoe building material during its placement on said core, a lever pivotally mounted on said frame, means connecting said lever with said tire-shoe shaping-tools arranged to operate the latter inwardly and outwardly over the surface of the material on said core during the placement of the former and during the revolution of said annulus.

3. A tire-shoe building machine comprising a normally-irrevoluble ring-core, an annulus arranged to revolve about said core in the plane of its diameter, a stock roller for carrying a supply of tire-building stock carried by said annulus, and means carried by said annulus embodying shaping tools for placing said tire-building material on said core.

In testimony whereof I have hereunto set my hand in presence of two subscribing witnesses.

CHARLES A. EDMONDS.

Witnesses:
C. E. HUMPHREY,
A. L. McCLINTOCK.